United States Patent [19]

Hattori et al.

[11] Patent Number: 5,060,187
[45] Date of Patent: Oct. 22, 1991

[54] DATA INPUT AND OUTPUT DEVICE

[75] Inventors: Hiroshi Hattori; Hideo Ueno, both of Nagoya, Japan

[73] Assignee: Brother Kogyo Kabushikikaisha, Aichi, Japan

[21] Appl. No.: 369,821

[22] Filed: Jun. 22, 1989

[30] Foreign Application Priority Data

Jun. 24, 1988 [JP] Japan ................. 63-157475

[51] Int. Cl.⁵ ................................. G06F 15/02
[52] U.S. Cl. ................. 364/900; 364/918; 364/927.92; 364/927.99; 364/964; 364/406
[58] Field of Search .......... 364/900 MS File, 406, 364/408, 200 MS File, 400

[56] References Cited

U.S. PATENT DOCUMENTS

| | | | |
|---|---|---|---|
| 4,092,523 | 5/1978 | Tava et al. ........................ | 364/408 |
| 4,449,198 | 5/1984 | Kroon et al. ..................... | 364/900 |
| 4,587,634 | 5/1986 | Ferrio et al. ..................... | 364/900 |
| 4,823,265 | 4/1989 | Nelson .............................. | 364/406 |
| 4,860,244 | 8/1989 | Bruckert et al. ................. | 364/900 |
| 4,870,590 | 9/1989 | Kawata et al. ................... | 364/468 |
| 4,901,276 | 2/1990 | Iiyima .............................. | 364/900 |

Primary Examiner—Allen R. MacDonald
Assistant Examiner—Gopal C. Ray
Attorney, Agent, or Firm—Kane, Dalsimer, Sullivan, Kurucz, Levy, Eisele and Richard

[57] ABSTRACT

A data input/output device is provided having a memory which includes a plurality of memory areas each of which has a particular format for storing input data. A display device displays the data in a format corresponding to a selected one of the formats. Inputted character data is stored in the memory area corresponding to the selected one of the formats and simultaneously into non-selected ones of the memory areas.

20 Claims, 15 Drawing Sheets

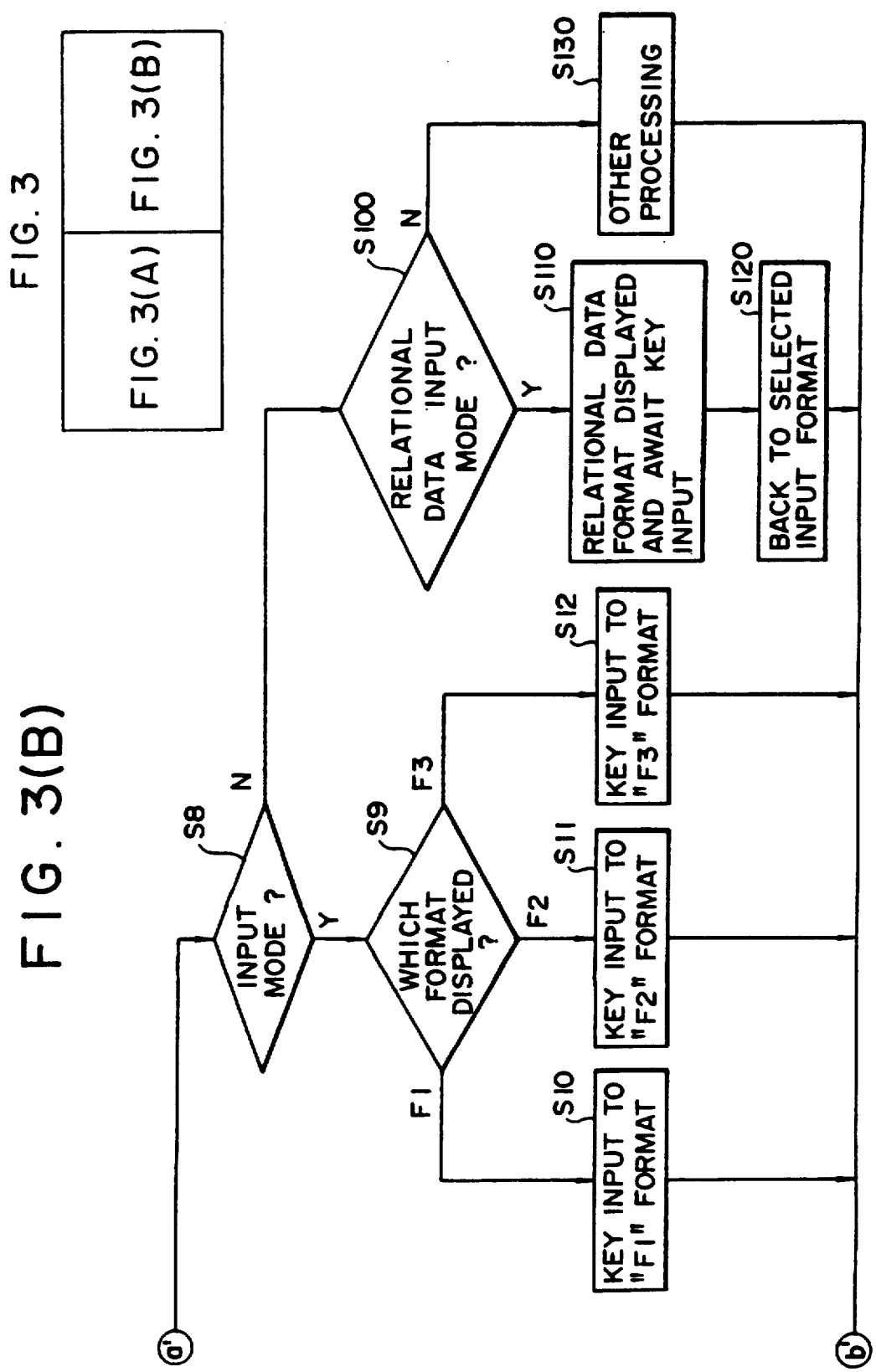

FIG. 4(A)

```
   ┌─100
   │ 1. TRANSFER ACCOUNT SLIP
   │ 2. CASH ACCOUNT BOOK
   │ 3. DEPOSIT ACCOUNT BOOK
```

FIG. 4(B)

TRANSFER ACCOUNT SLIP  JANUARY 25

| DEBIT AMOUNT | DEBIT ACCOUNT | REMARKS | CREDIT ACCOUNT | CREDIT AMOUNT |
|---|---|---|---|---|
| 300,000 | ORDINARY DEPOSIT | TOKAI BANK | CASH | 300,000 |
| | | | | |
| | | | | |
| | | | | |

FIG. 5(A)

CASH

| MONTH | DATE | TERM | REMARKS | CASH RECEIVED | PAYMENT | BALANCE |
|---|---|---|---|---|---|---|
| 1 | 16 | ACCOUNT RECEIVABLE ON SALES | PAYMENT TO ITOH & CO. FOR BROOMS | 1,500 | | 151,500 |
| 1 | 17 | FIXED DEPOSIT | TOKAI BANK | 200,000 | | 350,000 |
| 1 | 18 | SALES | ROLLED PAPERS 15 PCS. | 1,200 | | 351,200 |
| 1 | 19 | SALES | BROOMS 3 PCS. | 3,000 | | 354,200 |
| 1 | 21 | PURCHASE | ROLLED PAPERS 50 PCS. | | 2,500 | 351,700 |
| 1 | 23 | PURCHASE | BROOMS 30 PCS. | | 12,000 | 339,700 |
| | | | | | | |

FIG. 5(B)

CASH

| MONTH | DATE | TERM | REMARKS | CASH RECEIVED | PAYMENT | BALANCE |
|---|---|---|---|---|---|---|
| 1 | 16 | ACCOUNT RECEIVABLE ON SALES | PAYMENT TO ITOH & CO. FOR BROOMS | 1,500 | | 151,500 |
| 1 | 17 | FIXED DEPOSIT | TOKAI BANK | 200,000 | | 350,000 |
| 1 | 18 | SALES | ROLLED PAPERS 15 PCS. | 1,200 | | 351,200 |
| 1 | 19 | SALES | BROOMS 3 PCS. | 3,000 | | 354,200 |
| 1 | 21 | PURCHASE | ROLLED PAPERS 50 PCS. | | 2,500 | 351,700 |
| 1 | 23 | PURCHASE | BROOMS 30 PCS. | | 12,000 | 339,700 |
| 1 | 25 | ORDINARY DEPOSIT | TOKAI BANK | | 300,000 | 39,000 |

FIG. 6(A)

| ORDINARY DEPOSIT | | | | | | |
|---|---|---|---|---|---|---|
| MONTH | DATE | TERM | REMARKS | | | |
| 1 | 5 | CASH | RECEIVED SALES AMOUNT | 500,000 | | 1,700,600 |
| 1 | 8 | ACCOUNTS PAYABLE | PAYMENT TO KAGEYAMA SHOJI | | 210,000 | 1,490,600 |
| 1 | 16 | ACCOUNT RECEIVABLE ON SALES | PAYMENT FROM ITOH & CO. | 120,000 | | 1,610,600 |
| 1 | 22 | ADVANCE | BUSINESS TRAVELLING EXPENSES TO TOKYO | | 30,000 | 1,580,600 |
| 1 | 23 | CASH | FOR PURCHASE | | 15,000 | 1,565,600 |
| | | | | | | |
| | | | | | | |

FIG. 6(B)

| ORDINARY DEPOSIT | | | | | | |
|---|---|---|---|---|---|---|
| MONTH | DATE | TERM | REMARKS | | | |
| 1 | 5 | CASH | RECEIVED SALES AMOUNT | 500,000 | | 1,700,600 |
| 1 | 8 | ACCOUNTS PAYABLE | PAYMENT TO KAGEYAMA SHOJI | | 210,000 | 1,490,600 |
| 1 | 16 | ACCOUNT RECEIVABLE ON SALES | PAYMENT FROM ITOH & CO. | 120,000 | | 1,610,600 |
| 1 | 22 | ADVANCE | BUSINESS TRAVELLING EXPENSES TO TOKYO | | 30,000 | 1,580,600 |
| 1 | 23 | CASH | FOR PURCHASE | | 15,000 | 1,565,600 |
| 1 | 25 | CASH | TOKAI BANK | 300,000 | | 1,865,600 |
| | | | | | | |

FIG.8(B)

1988 SEP.

| DAY | ITEM | SCHEDULE | SCHEDULE |
|-----|------|----------|----------|
| 13 | TIME | 13:30 | 10:00 |
|    | CONTENTS | Meeting at 5F room | Meeting at 3F hall |
| 14 | TIME | | |
|    | CONTENTS | | |
| 15 | TIME | | |
|    | CONTENTS | | |

FIG.8(C)

1988 SEP.

| DAY | ITEM | SCHEDULE | SCHEDULE |
|-----|------|----------|----------|
| 13 | TIME | 10:00 | 13:30 |
|    | CONTENTS | Meeting at 3F hall | Meeting at 5F room |
| 14 | TIME | | |
|    | CONTENTS | | |
| 15 | TIME | | |
|    | CONTENTS | | |

FIG. 9(B)

| 1988 | | | |
|---|---|---|---|
| 12 Mon. | 13 Tue. | 14 Wed. | |
| | 13:30 Meeting at 5F room | | |
| | 10:00 Meeting at 3F hall | | |
| 15 Thu. | 16 Fri. | 17 Sat. | 18 Sun. |
| | | | Wedding □ —100 |

FIG. 9(C)

| 1988 | 9 | | |
|---|---|---|---|
| 12 Mon. | 13 Tue. 10:00 Meeting at 3F hall 13:30 Meeting at 5F room | 14 Wed. | |
| 15 Thu. | 16 Fri. 15:00 Meeting at 3F hall | 17 Sat. Wedding □ ←100 | 18 Sun. Golf with Mr. Verona |

FIG. 10

SEPTEMBER, 1988

| SUNDAY | MONDAY | TUESDAY | WEDNESDAY | THURSDAY | FRIDAY | SATURDAY |
|---|---|---|---|---|---|---|
| | | | | 1 | 2 | 3<br>Golf<br>Mr. Jones |
| 4 | 5 | 6 | 7 | 8 | 9 | 10 |
| 11 | 12 | 13<br>10:00,<br>13:30<br>Meeting | 14 | 15 | 16<br>15:00<br>Meeting | 17<br>Wedding ☐<br>100 |
| 18<br>Golf<br>Mr. Verona | 19 | 20 | 21 | 22 | 23 | 24 |
| 25 | 26 | 27 | 28<br>15:00<br>Meeting | 29 | 30 | |

FIG. II

| 1988 | | <MEETING> |
|---|---|---|
| Sun.Mon.Tue.Wed.Thu.Fri.Sat | Sun.Mon.Tue.Wed.Thu.Fri.Sat | Sun.Mon.Tue.Wed.Thu.Fri.Sat |
| 1 ··· ··· ··· ··· ··· 1 2<br>3 4 5 6 7 8 9<br>10 11 12 13 14 15 16<br>17 18 19 20 21 22 23<br>24 25 26 27 28 29 30<br>31 ··· ··· ··· ··· ··· ··· | 2 ··· 1 2 3 4 5 6<br>7 8 9 10 11 12 13<br>14 15 16 17 18 19 20<br>21 22 23 24 25 26 27<br>28 29 ··· ··· ··· ··· ···<br>··· ··· ··· ··· ··· ··· ··· | 3 ··· ··· 1 2 3 4 5<br>6 7 8 9 10 11 12<br>13 14 15 16 17 18 19<br>20 21 22 23 24 25 26<br>27 28 29 30 31 ··· ···<br>··· ··· ··· ··· ··· ··· ··· |
| 4 ··· ··· ··· ··· ··· 1 2<br>3 4 5 6 7 8 9<br>10 11 12 13 14 15 16<br>17 18 19 20 21 22 23<br>24 25 26 27 28 29 30<br>··· ··· ··· ··· ··· ··· ··· | 5 1 2 3 4 5 6 7<br>8 9 10 11 12 13 14<br>15 16 17 18 19 20 21<br>22 23 24 25 26 27 28<br>29 30 31 ··· ··· ··· ···<br>··· ··· ··· ··· ··· ··· ··· | 6 ··· ··· ··· 1 2 3 4<br>5 6 7 8 9 10 11<br>12 13 14 15 16 17 18<br>19 20 21 22 23 24 25<br>26 27 28 29 30 ··· ···<br>··· ··· ··· ··· ··· ··· ··· |
| 7 ··· ··· ··· ··· ··· 1 2<br>3 4 5 6 7 8 9<br>10 11 12 13 14 15 16<br>17 18 19 20 21 22 23<br>24 25 26 27 28 29 30<br>31 ··· ··· ··· ··· ··· ··· | 8 ··· 1 2 3 4 5 6<br>7 8 9 10 11 12 13<br>14 15 16 17 18 19 20<br>21 22 23 24 25 26 27<br>28 29 30 31 ··· ··· ···<br>··· ··· ··· ··· ··· ··· ··· | 9 ··· ··· ··· ··· 1 2 3<br>4 5 6 7 8 9 10<br>11 12 13 14 15 16 17<br>18 19 20 21 22 23 24<br>25 26 27 28 29 30 ···<br>··· ··· ··· ··· ··· ··· ··· |
| 10 ··· ··· ··· ··· ··· ··· 1<br>2 3 4 5 6 7 8<br>9 10 11 12 13 14 15<br>16 17 18 19 20 21 22<br>23 24 25 26 27 28 29<br>30 31 ··· ··· ··· ··· ··· | 11 ··· ··· 1 2 3 4 5<br>6 7 8 9 10 11 12<br>13 14 15 16 17 18 19<br>20 21 22 23 24 25 26<br>27 28 29 30 ··· ··· ···<br>··· ··· ··· ··· ··· ··· ··· | 12 ··· ··· ··· ··· 1 2 3<br>4 5 6 7 8 9 10<br>11 12 13 14 15 16 17<br>18 19 20 21 22 23 24<br>25 26 27 28 29 30 31<br>··· ··· ··· ··· ··· ··· ··· |

FIG. 12

DATA INPUT AND OUTPUT DEVICE

BACKGROUND OF THE INVENTION

This invention relates to a data input and output device of a type used for accounting processing and the like, more particularly, to a data input and output device for respectively inputting the same data to relevant formats of a plurality of display formats.

Conventionally, this type of a data input and output device has a plurality of display formats and data having the same meaning or content must be repreatedly input to a plurality of formats, and thus the input must be executed many times for respective image displays.

More specifically, for example, in a book keeping executed using a computer, there are different display formats for a transfer account slip, a cash account book, a deposit account boook and the like and each format includes many columns to which data cooresponding to the same content is to be inputted. Nevertheless, the data of the same content must be inputted in the respective display formats many times in a data input operation and the data must be corrected or deleted in the respective formats. As a result, a chance for the data to be incorrectly inputted is increased and the input operation is not always carried out efficiently.

SUMMARY OF THE INVENTION

It is therefore an object of the invention to provide an improved input and output device having a function capable of inputting data corresponding to the same contents in an arbitrary input mode regardless of the format mode of an input image displayed in the less number of input operations and correcting and deleting the inputted data.

With this device, a display format used when data is input is not limited to one kind of a format, but the input, correction and the like of the data can be executed from any of a plurality of kinds of display formats, and further the same data can be input to different kinds of display formats by inputting the data only once.

For this purpose, according to this invention there is provided a data input and output device comprising input means for inputting character data, represent means for representing characters in response to the inputted data, said data input and output device further comprises: memory means including a plurality of memory areas, each of said memory areas respectively having an input format, for storing the inputted data; select means for selecting one of said memory areas; represent control means for controlling said represent means so as to represent the contents of the memory area selected by said select means with its own input format; and input control means for controlling said input means so as to input character data to the memory area of which contents are represented by said represent control means and for simultaneously storing the character data into the other memory areas.

DESCRIPTION OF THE ACCOMPANYING DRAWINGS

FIG. 3 shows the relationship between FIGS. 3(A) and 3(B). FIGS. 3(A) and 3(B) are a flow chart showing one example of control routines taking place in the electronic control unit of FIG. 2;

FIG. 4(A) is an illustrative view showing a display screen for selecting one of input formats;

Figures 7, 8A:
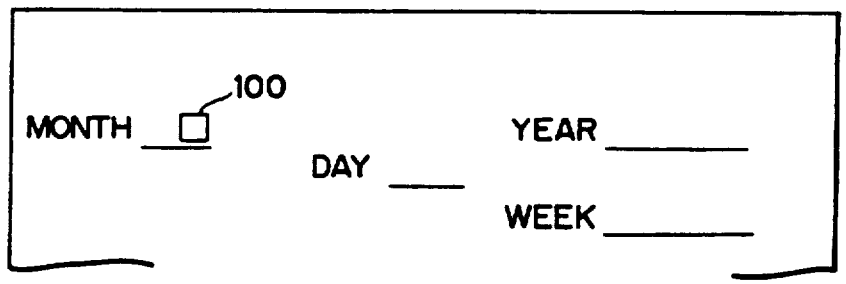

FIG. 4(B), 5(A), 5(B), 6(A) and 6(B) are examples of displayed screens, for explaining how image displayed in a plurality of formats;

FIG. 7 is an another illustrative view showing a display screen for selecting one of input format;

FIG. 8(A) is one example of an illustrative view for explaining how image displayed in the screen;

FIGS. 8(B) and 8(C) are illustrative views for explaining how the inputted data stored in a memory;

FIGS. 9(A), 9(B), 9(C), 10 and 11 are another examples of displayed screens; and FIG. 12 is an illustrative view showing an input format for inputting the relational data.

DESCRIPTION OF THE EMBODIMENTS

Figure 1:
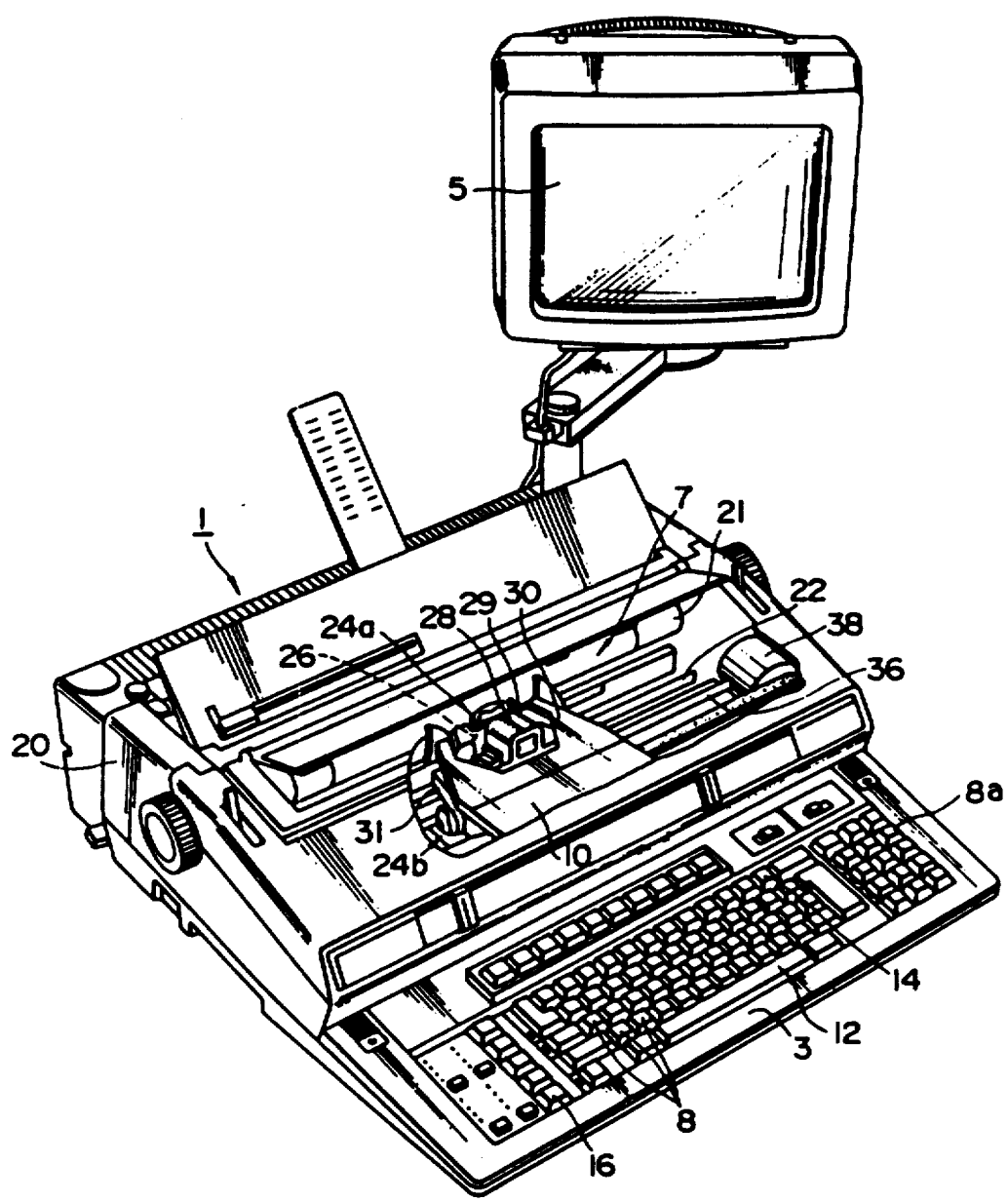
FIG. 1 is a perspective view the data input and output device embodying the present invention.

FIG. 1 shows a data input and output device embodying the invention, which is provided with a keyboard 3 with a plurality of keys, a display unit 5 for displaying characters in response to the inputted data and a printer 7 for printing chatacters. The keyboard 3 consists of character keys 8 including numeral keys 8a for inputting alphanumerical character codes and symbols, a space key 12 for moving a carriage by one digit to the right, and other function keys.

The display unit 5 indicates the text data inputted through the keyboard 3 and messages for an operator sent from the data input and output device 1.

The printer 7 is provided with a platen 21 rotatably carried by a main unit 20 to retain a piece of print sheet, not shown, a pair of guide bar 22 provided in parallel with the platen 21, and the carriage 10 mounted to move along the pair of guide bars 22. The cariage 10 has mounted thereon a print assembly 24a for printing characters on the print sheet. The print assembly 24a consists of a daisy wheel 26, a ribbon cassette 30 accommodating a print ribbon 29 and an erasure assembly 24b for deleting characters printed on the print sheet using an erasure ribbon 31. Engaged with the carriage 10 is a timing belt 36 which is wound aroung a drive pulley, not shown, mounted on the frame.

Figure 2:
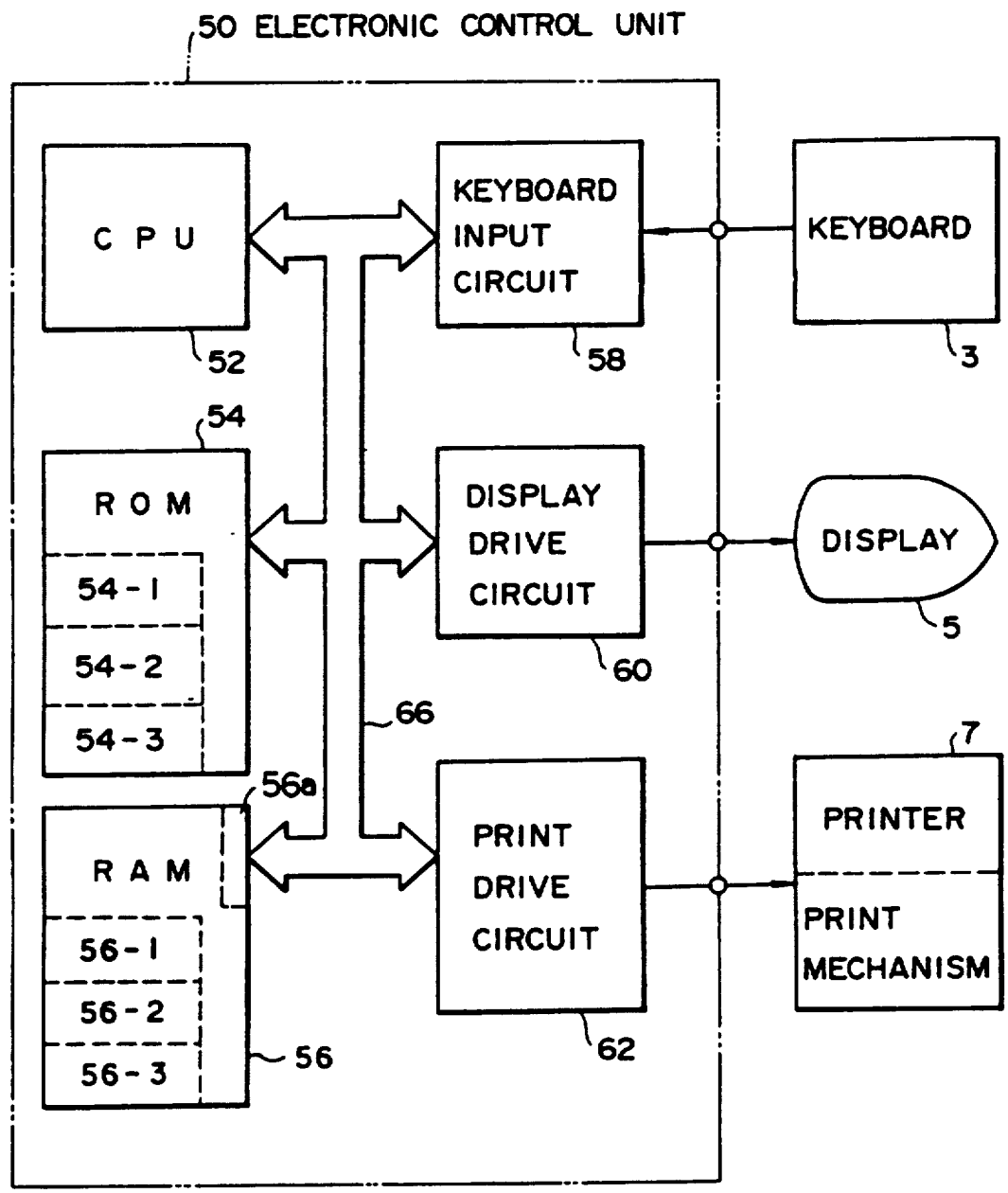
FIG. 2 is a structural view of showing an electronic control unit and its peripheral units of the data input and output device of FIG. 1.

The keyboard 3, the display unit 5 and the printer 7 are all electrically connected with an electronic control system 50 incorporated in the main unit 20. As shown in FIG. 2, the electronic control system 50 is constituted by a known CPU (Central Processing Unit) 52, a ROM (Read Only Memory) 54 with control programs and data stored in advance including a program memory 54-1, a job memory 54-2 and a format memory 54-3 for displaying one of formats in accordance with a control signal transmitted from the CPU 52, a RAM (Random Access Memory) 56 including a plurality of memory areas (56-1, 56-2, 56-3) for respectively storing the data inputted in accordance with each input format (F1, F2, F3), a keyboard input circuit 58, a display drive curcuit 60, a print drive circuit 62, and other circuits electrically connected together via a common bus 66. The CPU 52 tentatively reads or writes data required for the RAM 56 in accordance with the programs stored in the control ROM 54, while executing subsequent input and output processings.

In particular, in a display mode the characters and other necessary information inputted through the keyboard 3 are shown on the display unit 5 by way of the display drive circuit 60. In a type mode, on the other hand, the characters inputted through the keyboard 3 are printed by driving the printer 7 by means of the print drive circuit 62.

The electronic control unit 50 has a function capable of discriminating a format displayed on the display unit 7 at the present time in conjunction with the program memory 54-1, the job memory 54-2 and the like inputting the desired data into this discriminated display format and a function for inputting the data input to this one kind of the display format on the display unit 7 to the other kinds of display formats and outputting the data image of the input data.

Figure 3A:
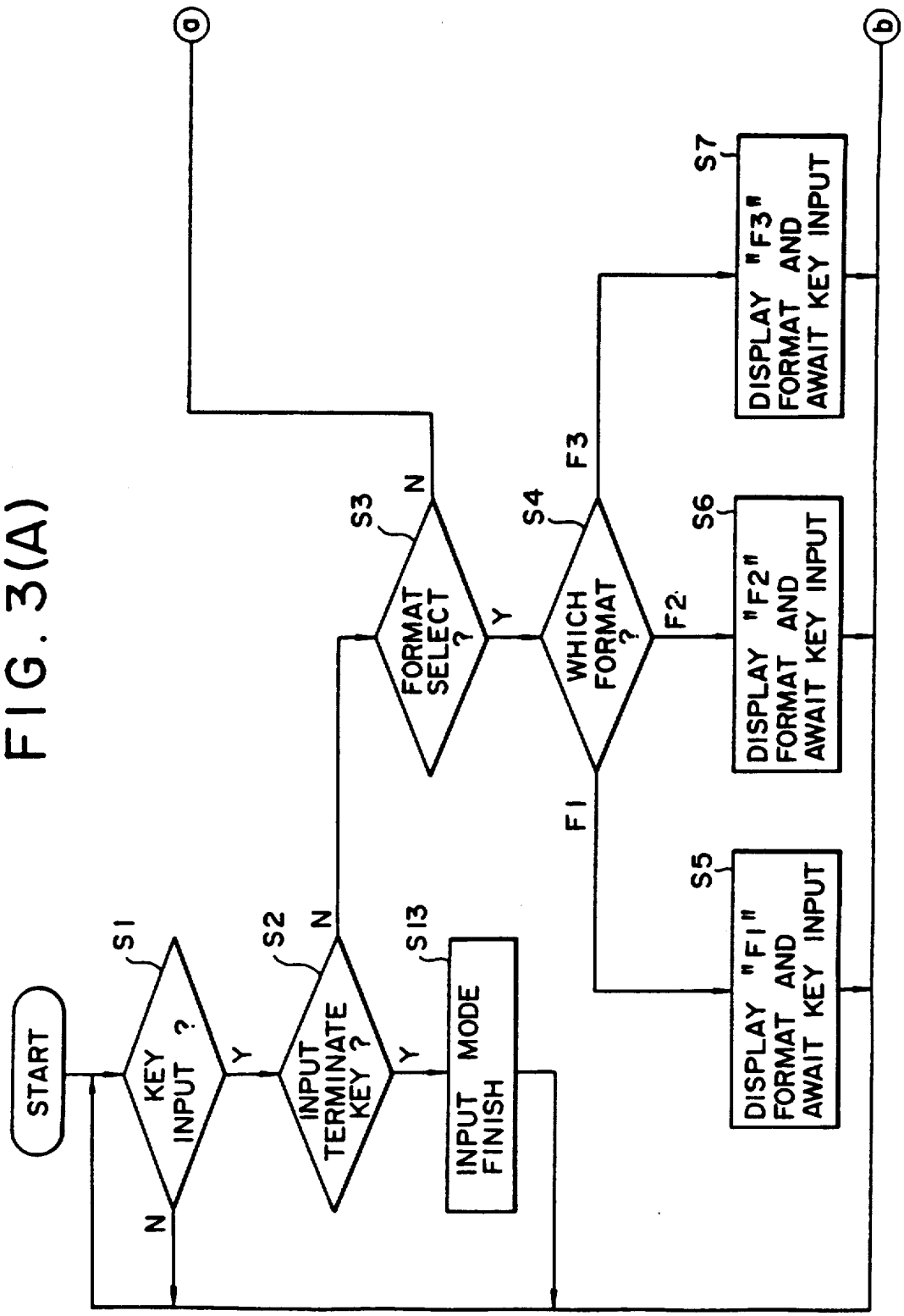

Operation of the electronic control unit 50 will be described with reference to a flowchart of FIG. 3, assuming that the format memory 54-3 includes the display formats for a transfer account slip, a cash account book and an ordinary deposit account book.

When an input is effected through the keyboard 3 and the input operation is not completed, whether the format selection is completed or not at step S1, S2 and S3. The format selection is executed by selecting one of the formats by setting a cursor 100 on the desired format, as shown in FIG. 4(A). If the format selection is completed the flow goes to any one of the respective modes according to the mode selected at step S4. More specifically, data regarding any one of the transfer account slip, the cash account book or the deposit account book are inputted to the selected format, and displayed.

When the format selection is not executed at step S3, whether the input mode is selected or not is determined at step S8. If the input mode is selected, a present mode is determined at step S9, and then the data input mode in an image display corresponding to any one of the respective modes is selected at step S10, S11, or S12. Further, the data are inputted through the keyboard 3 in accordance with the selected input format and simultaneously stored in the positions of the memory areas 56-1-56-3 corresponding to the input position of selected input format on the display unit 5.

When an input terminate key 14 for terminating a key input operation is turned on at step S2, the present mode is closed and the input mode is finished at step S13.

Examples of images displayed when the above processings are executed will be described with reference to FIG. 4(B) through FIG. 6.

FIG. 4(B) through FIG. 6 show how displays in the modes other than the transfer account slip mode change when data is inputted in the display format of the transfer account slip. More specifically, FIG. 4(B) shows that the transfer account slip is provided with such data as data "January 25", debited amount "300,000", debit account "ordinary deposit", remarks "Tokai Bank", credit account "cash" and credited amount "300,000", respectively.

The image display of the cash account book display before this data inputted as shown in FIG. 5(A) changes to the image display shown in FIG. 5(B) after this data inputted. This shows that necessary data are automatically stored into the cash account book based on the data inputted to the transfer account slip.

Further, the image of an ordinary deposit account book displayed before this data inputted as shown in FIG. 6(A) changes to the image display shown in FIG. 6(B) after this data inputted.

When additional data are inputted to the cash account book in the image of a display format of the cash account book shown in FIG. 5(A), these data are additionally inputted which includes data "January 25", account "ordinary deposit", remarks "Tokai Bank", disbursement "300,000", and thus the image shown in FIG. 5(B) is displayed. An image display of the transfer account slip in the other display format in changed as shown in FIG. 4(B) by this data input, and the image display of the ordinary deposit account book before this data input shown in FIG. 6(A) is changed to the image display shown in FIG. 6(B) after this data input.

Furthermore, when additional data are inputted to the deposit account book in the image of the display format of the deposit account book shown in FIG. 6(A), these data are additionally inputted which includes date "January 25", account "cash", remarks "Tokai Bank", money deposit "300,000", and then the image shown in FIG. 6(B) is displayed like the above case. The image display of the transfer account slip is changed as shown in FIG. 4(B) by this data input, and the image display of the cash account book before this data input shown in FIG. 5(A) is changed to the image display shown in FIG. 5(B) after this data input.

As an another example of images displayed on the display unit 5, operations of the electronic control unit 50 will be described with reference to FIGS. 7 through 12, assuming that the format memory 54-3 includes the display formats for a daily schedule, a weekly calendar, a monthly clalender, and a year calendar.

In this case, one display input format, for example a daily schedule, is corresponding to the minimum unit comprised in the other of display format, i.e. weekly calendar.

In step S3, as shown in FIG. 7 the format designate screen is displayed on the display unit 5. The desired format is designated by placing the cursor 100 on the desired format title. The above designated operation are executed by depressing numeral keys 8a.

Figure 9A:
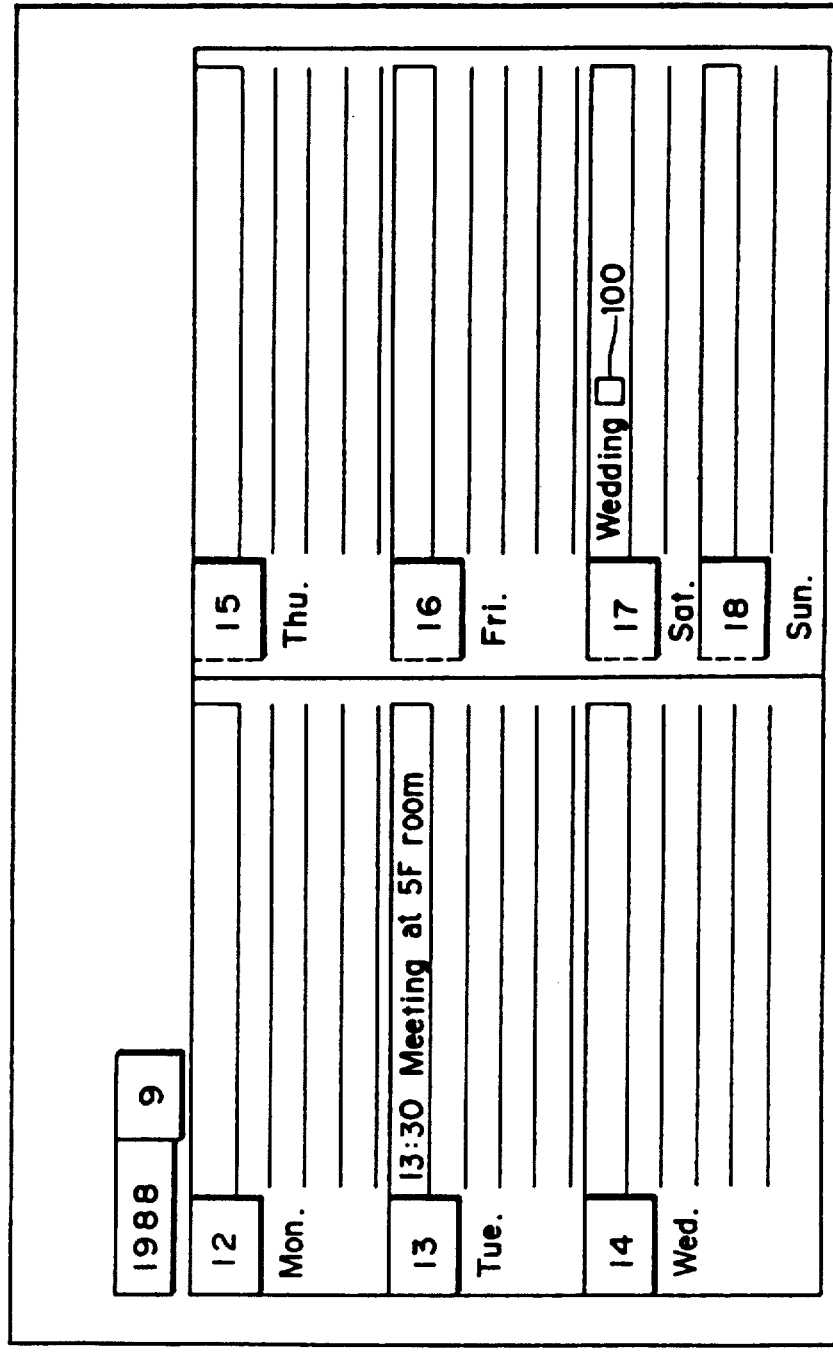

For example, in FIG. 7, after the designation of month "9", date "13", and year "1988" are designated, the format screen as shown in FIG. 8 is displayed. An operator is able to input the desired data to the displayed format and the data are automatically stored into the corresponding position of the other format. For example, in the daily schedule, if the data "13:30 Meeting at 5F room" are inputted as shown in FIG. 8(A), the inputted data are automatically stored into the corresponding positions of each memory areas included in RAM 56 as shown in FIG. 9(A) (weekly calendar) and in FIG. 10 (monthly calendar). If a schedule "10:00 meeting at 3F hall" is added after the schedule "13:30 meeting at 5F room" is inputted, the former schedule is inputted into a memory as shown in FIG. 8(B) and represented as shown in FIG. 8(A) and FIG. 9(B). It may be considered that another memory area 56a for tentatively storing the inputted data is provided and the CPU 52 controls the data so as to be arranged in order of time before the data are stored in each of memory areas. In this case, as shown in FIG. 8(C), a plurality of schedules included in a day are stored in order of time. After the schedule "10:00 Meeting at 3F hall" is determined, some of schedules on Sept. 16 and 18 are determined and stored. Next time the weekly calendar format are represented, for example, in the weekly calendar, the schedules on Sept. 13 are represented in order of time as shown in FIG. 9(C). Furthermore, it may be considered that the CPU 52 controls the inputted data stored as shown FIG. 8(B) so as to be represented in order of time. In this arrangement, it is unnecessary to provide the memory area 56a.

With respect to the year calendar, since it is impossible to display the inputted data, it may be considered that the positions corresponding to the days at which some data are stored are discriminately displayed on the display unit 5. In this case, it may be considered that the desired item is inputted. For example, as shown in FIG. 11, the "meeting" is inputted on the display unit 5 and the positions of the days at which the character string "meeting" are stored are searched and blinkingly displayed.

Furthermore, it may be considered that a relational data memory area format is displayed. If the desired year and the month are designated and further comment display key 16 is depressed in step S100 of FIG. 3, the comment format screen is displayed as shown in FIG. 12. In this case, the year 1988 and the month 9 are designated and the operator is able to input the desired comment which relates to the September of 1988 regardless of the states of the above calendar format. It may be considered that each of the memory area have only input format and the CPU 52 controls the inputted data so as to be represented in the desired position on the represented input format.

As described above, according to the present invention, an image of a displayed input format is not limited to one kind of a format when data is inputted, but the input, correction and the like of the data can be executed from any of a plurality kinds of arbitrary display input formats. Further, since data having the same content is stored into inputted, it is not necessary to input in different formats repeatedly. As a result, not only a mistake in a data input operation is prevented but also the efficiency of operation is greatly improved, which makes a significant contribution to a book keeping or a schedule management using a computer and the like.

What is claimed is:

1. A data input and output device comprising input means for inputting character data, represent means connected to said input means for representing at least characters in response to data inputted by said input means, said input and output device further comprises:
    memory means including a plurality of memory areas, each of said memory areas respectively having an input format, for storing the inputted data;
    select means for selecting one of said memory areas included in said memory means;
    represent means for controlling said represent means so that said represent means represents the contents of the memory area selected by said select means in the format of the selected one memory area; and
    input control means for controlling said input means so as to input character data to the memory area whose contents are represented by said represent control means on said represent means and for simultaneously storing the character data into corresponding areas of the non-selected ones of said memory areas.

2. The data input and output device according to claim 1 wherein said memory areas respectively comprise a plurality of units and at least one unit of each one of said memory areas corresponds to a unit included in one of the other memory areas.

3. The data input and output device according to claim 2 wherein said represent control means further controls said represent means so as not to represent the inputted data if a data length of said inputted data is larger than the length of the represent space of the unit at which the inputted data are stored and to separately represent the position corresponding to the unit from the other positions.

4. The data input and output device according to claim 2 wherein said represent control means further controls said represent means so as to represent the desired portion of inputted data in case that the data length of said the inputted data is larger than the length of the represent space of the unit at which the inputted data are stored.

5. The data input and output device according to claim 2 which further comprises relational data memory area setting means for representing a relational data memory format corresponding to one of said units on said represent means.

6. The data input and output device according to claim 1 wherein said device is used for book keeping and said input formats of said memory areas comprising book keeping and said formats including transfer account slip format, a cash account book format, and a deposit account book format.

7. The data input and output device according to claim 1 wherein said device is used as a calendar and said input formats of said memory areas comprising calendar formats including daily schedule format, weekly calendar format, monthly calendar format, and year calendar format.

8. The data input and output device according to claim 7 which further comprises item designate means for designating the desired item of the inputted data and wherein said represent control means further controls said represent means so as to blinkingly represent the positions corresponding to the units of days at which the desired items are stored in case that the memory area corresponding to the year calendar format is selected by said select means.

9. The data input and output device according to claim 1 which further comprises print means for printing out the contents of said memory area and the corresponding input format represented on said represent means.

10. A data input and output device comprising input means for inputting character data, represent means connected to said input means for representing at least characters in response to data inputted by said input means, said input and output device further comprises:
    first memory means for storing a plurality of input format data;
    second memory means for storing the data inputted by said input means;
    select means for selecting one of said input formats stored in said first memory means;
    represent control means for controlling said represent means so as to represent the input format selected by said select means and inputted data in accordance with the selected one input format; and,
    input control means for controlling said input means so as to input character data to the memory area included in said second memory means in accordance with an input position on said represent means at which the inputting operation is executed.

11. The data input and output device according to claim 10 wherein said input formats respectively comprise a plurality of units and at least one unit of each of said input formats corresponds to a unit included in at least one of the other input formats.

12. The data input and output device according to claim 11 wherein said device is used for scheduling and said input formats of said memory areas a daily schedule format, a weekly calendar format, a monthly calendar format, and a year calendar format.

13. The data input and output device according to claim 12 which further comprises third memory means for storing the inputted data before the data are stored into said second memory means; and memory control means for controlling said third memory means so as to store the inputted data in order of time and to send the inputted data to said second memory means.

14. The data input and output device according to claim 13 wherein said represent control means controls said represent means so as to represent the inputted data having been passed through said third memory means and stored in said second memory means.

15. The data input and output device according to claim 12 which further comprises item designate means for designating the desired item of the inputted data and wherein said represent control means further controls said represent means so as to blikingly represent the positions correspoding to the units of days at which the desired items are stored in case that the year calendar format is selected by said select means.

16. The data input and output device according to claim 12 which further comprises sort means for controlling the inputted data to be represented on said represent means so as to be represented in order of time.

17. The data input and output device according to claim 11 wherein said represent control means further controls said represent means so as not to represent the inputted data if a data length of said inputted data is larger than the length of the represent space of the unit at which the inputted data are stored and to separately represent the position corresponding to the unit from the other positions.

18. The data input and output device according to claim 11 wherein said represent control means further controls said represent means so as to represent the desired portion of the inputted data in case that the data length of said inputted data is larger than the length of the represent space of the unit at which the inputted data are stored.

19. The data input and output device according to claim 10 which further comprises third memory means for storing the inputted data before the data are stored into said second memory means; and memory control means for controlling said third memory means so as to store the inputted data in a predetermined order and to send the inputted data to said second memory means.

20. The data input and output device according to claim 10 which further comprises sort means for controlling the inputted data to be represented on said represent means so as to be represented in a predetermined order.

* * * * *